Sept. 29, 1936. P. MARINACCI 2,055,845
WALKING STICK
Filed July 24, 1935
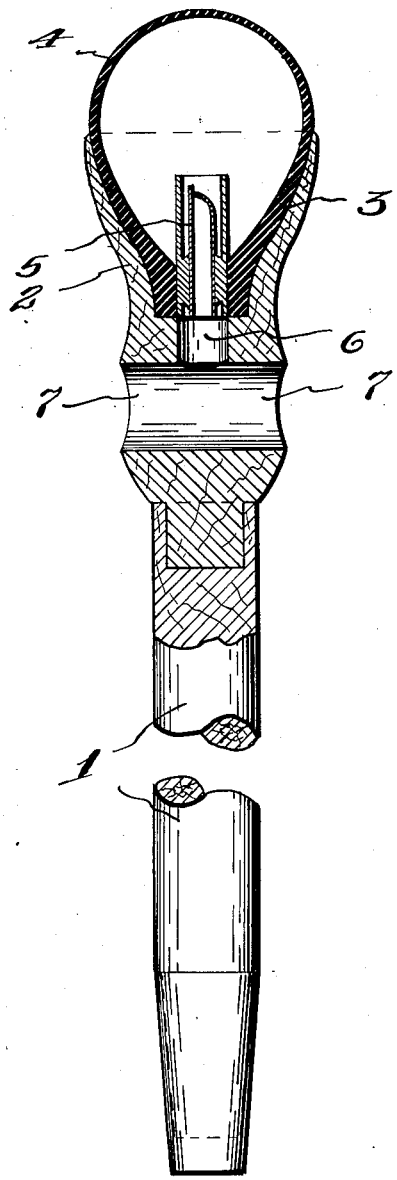
INVENTOR.
Pasquale Marinacci
BY
Bodell + Thompson
ATTORNEYS.

Patented Sept. 29, 1936

2,055,845

UNITED STATES PATENT OFFICE 2,055,845

WALKING STICK

Pasquale Marinacci, Syracuse, N. Y.

Application July 24, 1935, Serial No. 32,921

4 Claims. (Cl. 135—47)

This invention has for its object an amusement device in the form of a cane, or walking stick, having a sound producing instrument embodied in the handle of the cane, and operating means also embodied in the handle to form a part thereof, and located as to operate the sound producing device, when the pressure of the hand is applied to the handle, when the lower end of the stick is thrust against the ground.

The invention consists in the novel features and in the combinations and constructions hereinafter set forth and claimed.

In describing this invention, reference is had to the accompanying drawing which is an elevation, partly broken away, of a cane or walking stick embodying my invention.

The walking stick comprises a shank or stick and a handle having a sound producing device therein and a compressible portion, which, when compressed, operates the device to produce a sound, the compressible portion being located at the upper side of the handle so that it may be compressed by the hand, when the lower end is thrust against the ground or other firm abutment.

The handle preferably comprises a hollow body and the exposed bulb portion extending into the body and having a reed or other sound producing device in the outlet or the neck thereof.

1 designates the shank or stick; 2 the hollow body of a handle suitably joined, secured or fitted to the upper end of the stick. 3 is a compressible bulb of rubber or other resilient material extending into the body 2 and having a rounding, dome-shaped, or hemispherical portion 4 extending beyond the outer end of the body.

5 is a reed in the outlet or neck of the bulb within the body. 6 is a sound passage having one or more outlets 7 to the outer air at the base of the knob.

In operation, when the stick is thrust against the ground and pressure applied, by the hand holding the handle, to the exposed part of the bulb, air will be forced through the reed or other instrument and sound produced.

The cane is intended primarily for an amusement device during gala occasions but obviously may be used for more dignified purposes, as a walking stick for the infirm, the lame, and the blind, to give warning.

What I claim is:—

1. A walking stick having a handle having a sound producing device therein and a compressible portion which, when compressed, operates said device, said compressible portion being located at the upper side of the handle whereby it is compressed by the pressure of the hand when the lower end of the stick is thrust against the ground.

2. A walking stick and the like having a handle and a sound producing device embodied in the handle, the handle including a compressible portion movable relatively to the stick and operable to operate the sound producing device in the handle upon relative movement of the handle and the stick.

3. A walking stick and the like having a handle portion compressible relatively to the stick by thrusting of the stick against a solid body and applying pressure to the handle, and a sound producing device self-contained with the handle and operable by such pressure on the handle portion.

4. A walking stick including a handle and a self-contained sound producing device, the handle having a compressible and resilient portion operable to operate the sound producing device upon compressing of the handle relatively to the stick.

PASQUALE MARINACCI.